３,355,416
Patented Nov. 28, 1967

3,355,416
DYEABLE POLYPROPYLENE
Robert W. Stevenson, Edison Township, Middlesex County, N.J., assignor to Mobil Oil Corporation, a corporation of New York
No Drawing. Filed May 27, 1963, Ser. No. 283,548
2 Claims. (Cl. 260—41)

This invention relates to tactic polyolefins having improved receptivity to dyes. It is more particularly concerned with dyeable tactic polyolefin composites with inorganic material.

As is well known to those familiar with the art, tactic polyolefins, such as tactic polypropylene, are very difficult to dye evenly. Many dyes do not adhere at all, while others give speckled coloring with large untinted areas. Numerous methods have been proposed to increase dyeability. It has been proposed to graft copolymerize dye-receptive monomers onto polyolefin backbones. It has also been proposed to blend polar organic materials with polyolefins. Other proposals include modification of the surface by electronic or chemical means, such as with phosgene. In so far as is now known, inorganic materials have not been proposed to increase receptivity to dyes.

It has now been discovered that the incorporation of small amounts of certain inorganic materials into tactic polyolefins greatly increases dye receptivity.

Accordingly, it is an object of this invention to provide tactic polyolefins having increased receptivity to dyes. Another object is to provide a method for increasing dye-receptivity of tactic polyolefins. A specific object is to provide dye-receptive tactic pololefins having incorporated therein small amounts of certain inorganic materials. Other objects and advantages of this invention will become apparent to those skilled in the art, from the following detailed description.

The present invention provides tactic polyolefins having incorporated therein small amounts, sufficient to improve the dye-receptivity thereof, of finely-divided precipitated silica.

The tactic polymers contemplated herein are the solid linear polymers of one or more olefinic hydrocarbons having the formula $CH_2=CHR$, wherein R is a cycloalkyl radical or an alkyl radical having between 1 and 8 carbon atoms per radical. The term "tactic" is a generic term applied to polymers in which there is an ordered structure with respect to the configurations around at least one main-chain site of steric isomerism per conventional base unit. Numerous types of tacticity are recognized in the art. Within the contemplation of this invention, a measure of steric order is the weight percent of the solid polymer that is insoluble in boiling n-heptane. A linear polymer of one or more monoolefinic hydrocarbons that is insoluble in boiling n-heptane is considered to be tactic.

The linear tactic polymers may be composed of isotactic or syndiotactic chains, blocks or mixtures of these forms. The terms isotactic and syndiotactic are used in accordance with the suggested definitions tentatively approved by the commission on Macromolecules of the International Union of Pure and Applied Chemistry, as outlined in the Journal of Polymer Science, volume 56, page 153–161, (1962). When prepared from two or more olefin monomers, the tactic polymer can be a block copolymer comprised of tactic blocks of each monomer. In practice, tactic polymers often contain sequences of atactic units in conjunction with tactic sequences. These polymers containing atactic sequences can still be insoluble in boiling n-heptane and they are tactic polymers within the contemplation of this invention. The polymers utilizable in this invention are at least 80 percent tactic or 80 percent insoluble in boiling n-heptane, and usually they are 95 percent, or more, tactic. Non-limiting examples of tactic polymers contemplated herein are polypropylene, poly-1-butene, poly-1-pentene, poly-1-hexene, poly-1-heptene, poly-3-methyl-1-butene, poly-4-methyl-1-pentene, poly-3,3-dimethyl-1-butene, poly-4,4-dimethyl-1-pentene, poly-4-methyl-1-hexene, poly-5-methyl-1-hexene, polyvinyl cyclohexane.

The inorganic material that is incorporated with the tactic polyolefin, in accordance with this invention is a finely-divided silica ($SiO_2$). Generally, it has a particle size of between about 12 millimicrons and about 1 micron.

As is well known to those familiar with the art, various inorganic materials including silica have been proposed to increase the physical properties of polymers. For the purpose of increasing physical properties, such as tensile strength, however, large amounts of fillers in the order of 50 percent or more have been used. On the other hand, the amount of finely-divided silica incorporated with tactic polyolefins in accordance with this invention is relatively small. Such small amounts have no appreciable effect on tensile properties. In general, the amount of silica incorporated according to this invention will be between about 0.1 percent and about 10 percent, preferably between about 0.1 percent and about 5 percent, by weight of the final polymer composition.

In addition to the finely-divided silica, the tactic polyolefin compositions of this invention can contain small amounts of other materials for specific purposes. Thus, for example, there can be incorporated small amounts of anti-oxidants and stabilizers. When the polymer is to be dyed with acid dyes, other dyeing adjuvants, such as polyvinylpyrrolidone, can be used, generally in amounts between about 0.1 percent and about 5 percent, by weight of final polymer composition.

The finely-divided silica can be incorporated into the tactic polyolefin, in accordance with this invention, by any means used for incorporating dry ingredients into polymer compositions by intensive working. Thus, for example, blending of the components can be effected by rolling on a mill, mixing in a Banbury mixer, or plasticating.

*Example 1*

Polypropylene powder having a reduced specific viscosity of 2.1 dl/g. (100% tactic, having been extracted for 24 hours with boiling heptane and dried) and various components (as hereinafter defined) were blended for fifteen minutes under nitrogen at 195–200° C. and at 30 R.P.M. on a (Brabender) plasticator. Five blends (identified 1a, 1b, etc.) were prepared. The composition of each blend is set forth in Table I. All amounts are parts by weight.

Each blend was ground and dried in vacuo. Then, films of about 3 mil thickness were prepared from each blend.

Control films were prepared from the polypropylene alone, with no other components added.

A dye bath was prepared containing water, sodium sulfate, sulfuric acid, and an acid dye, Cyanamid Calcocid Blue AX Double (Color Index Acid Blue 7). Films of each blend were treated at 95° C. for one hour in separate portions of the dye bath. A control film was similarly treated. After one hour, the films were boiled in a soap solution for 5 minutes. The films were washed and dried. The results of the dyeing process for each film are set forth in Table I.

TABLE I

| Example | Polypropylene, Parts | Blending Agent | | Appearance of Film |
|---|---|---|---|---|
| | | Parts | Type | |
| Control | 100.0 | | | No Color. |
| 1a | 97.5 | 2.5 | Silica ¹ | Slight, even tint. |
| 1b | 95.0 | 2.5 / 2.5 | Silica ¹ / Polyvinylpyrrolidone | Medium tint, slight blotching. |
| 1c | 97.5 | 2.5 | Polyvinylalcohol | Blotches only. |
| 1d | 95.0 | 2.5 / 2.5 | do / do | Medium tint, badly blotched. |
| 1e | 97.5 | 2.5 / 2.5 | Polyvinylpyrrolidone / do | Medium tint, distinctly blotched. |

¹ "Quso G30" (Philadelphia Quartz Co.); ultimate particle size 12 millimicrons.

*Example 2*

Films prepared as defined and described in Example 1 were each treated at 95° C. for one hour in separate dye baths containing water, acetic acid, sodium acetate, and the basic dye Calcozine Red BX (Color Index Basic Violet 10). Then, each film was boiled in a soap solution for 5 minutes, washed, and dried. The results of the dyeing operation for each film are set forth in Table II, together with a recapitulation of the films content.

Although the present invention has been described with preferred embodiments, it is to be understood that modifications and variations may be resorted to, without departing from the spirit and scope of this invention, as those skilled in the art will readily understand. Such variations and modifications are considered to be within the purview and scope of the appended claims.

What is claimed is:

1. Tactic polypropylene having incorporated therein between about 0.1 percent and about 5 percent, by weight of the final polymer composition, of a silica gel having particle size of between about 12 millimicrons and about 1 micron.

2. Tactic polypropylene having incorporated therein between about 0.1 percent and about 5 percent, by weight of the final polymer composition, of a silica gel having particle size of between about 12 millimicrons and about 1 micron and between about 0.1 percent and about 5 percent, by weight of the final polymer composition, of polyvinylpyrrolidone.

TABLE II

| Example | Polypropylene, Parts | Blending Agent | | Appearance of Film |
|---|---|---|---|---|
| | | Parts | Type | |
| Control | 100.0 | | | Large speckles, untinted areas. |
| 2a | 97.5 | 2.5 | Silica ¹ | Deep, level shade. |
| 2b | 95.0 | 2.5 / 2.5 | Silica ¹ / Polyvinylpyrrolidone | Deep, nearly level shade. |
| 2c | 97.5 | 2.5 | Polyvinyl alcohol | Speckled. |
| 2d | 95.0 | 2.5 / 2.5 | do / do | Do. |
| 2e | 97.5 | 2.5 / 2.5 | Polyvinylpyrrolidone / do | Finely speckled. |

¹ "Quso G30" (Philadelphia Quartz Co.); ultimate particle size 12 millimicrons.

References Cited

UNITED STATES PATENTS

| | | | |
|---|---|---|---|
| 3,049,507 | 8/1962 | Stanton et al. | 260—45.5 |
| 3,073,667 | 1/1963 | Bonvincini et al. | 8—115.5 |
| 3,264,253 | 8/1966 | McCulloch et al. | 260—41 |

FOREIGN PATENTS 618,060  11/1960  Belgium.

OTHER REFERENCES

Derwent Belgian Patent Reports, 1962, Derwent, London, 1962 (vol. 95B, page 9, 618,060 relied on).

Smith: Vinyl Resins, Reinhold, New York, 1958, pages 264, 265.

MORRIS LIEBMAN, *Primary Examiner.*

J. S. WALDRON, S. L. FOX, *Assistant Examiners.*